(12) United States Patent
Sutoh et al.

(10) Patent No.: US 8,396,830 B2
(45) Date of Patent: *Mar. 12, 2013

(54) DATA CONTROL METHOD FOR DUPLICATING DATA BETWEEN COMPUTER SYSTEMS

(75) Inventors: Atsushi Sutoh, Kokubunji (JP); Tsunehiko Baba, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1105 days.

This patent is subject to a terminal disclaimer.

(21) Appl. No.: 12/003,271

(22) Filed: Dec. 21, 2007

(65) Prior Publication Data

US 2008/0114815 A1 May 15, 2008

Related U.S. Application Data

(63) Continuation of application No. 10/630,707, filed on Jul. 31, 2003, now Pat. No. 7,383,264.

(30) Foreign Application Priority Data

Mar. 27, 2003 (JP) .................................. 2003-086920

(51) Int. Cl.
*G06F 7/00* (2006.01)
*G06F 17/00* (2006.01)

(52) U.S. Cl. ..................................................... 707/610

(58) Field of Classification Search .................. 707/610, 707/999.1
See application file for complete search history.

(56) References Cited

U.S. PATENT DOCUMENTS

| | | | | |
|---|---|---|---|---|
| 5,408,649 A | * | 4/1995 | Beshears et al. | 714/10 |
| 5,640,561 A | * | 6/1997 | Satoh et al. | 707/999.202 |
| 6,629,264 B1 | * | 9/2003 | Sicola et al. | 714/15 |
| 7,433,948 B2 | * | 10/2008 | Edsall et al. | 709/224 |
| 2003/0014432 A1 | * | 1/2003 | Teloh et al. | 707/204 |
| 2003/0096605 A1 | | 5/2003 | Schlieben et al. | 455/419 |
| 2003/0109271 A1 | | 6/2003 | Lewis et al. | 455/517 |
| 2003/0126133 A1 | * | 7/2003 | Dattatri et al. | 707/10 |
| 2003/0153302 A1 | | 8/2003 | Lewis et al. | 455/412 |
| 2003/0220935 A1 | | 11/2003 | Vivian et al. | |
| 2004/0098425 A1 | | 5/2004 | Wiss et al. | |

FOREIGN PATENT DOCUMENTS

JP 2000 181634 6/2000

OTHER PUBLICATIONS

"Oracle9I Database Summary" Oracle Corporation, an Oracle White Paper, May 2002, pp. 1-35.
"Hitachi's Integrated Storage Solution, Storeplaza" Hitachi, Jan. 2001 (English translation attached).

* cited by examiner

*Primary Examiner* — Alexey Shmatov
(74) *Attorney, Agent, or Firm* — Brundidge & Stanger, P.C.

(57) ABSTRACT

An application processing system including a database server and a storage device which is connected with a standby application processing system including a secondary database server and a secondary storage device to continue to carry out application processing in the case of a fault, disaster, etc. or for maintenance. The storage device of the application processing system issues a log disk update request to the secondary database server of the standby system to update a log disk of the standby system and thereby create a duplicate of the log disk for the DBMS of the application processing system. This allows the DBMS of the standby system to roll forward the log data in the duplicated log to update duplicated data on the secondary storage device.

17 Claims, 7 Drawing Sheets

DATA CONTROL METHOD FOR DUPLICATING DATA BETWEEN COMPUTER SYSTEMS

The present application is a continuation of application Ser. No. 10/630,707, filed Jul. 31, 2003 now U.S. Pat. No. 7,383,264, the contents of which are incorporated herein by reference.

FIELD OF THE INVENTION

The present invention relates to an application system including computers and storage devices, and more particularly to a data control method for duplicating data between a plurality of systems and a method for switching to the system which has duplicated the data, at high speed.

BACKGROUND OF THE INVENTION

One way to duplicate data between a plurality of application systems each made up of a database server and a storage device is to have the DBMSs running on the database servers duplicate the data. A method for duplicating data by use of DBMSs is described in ORACLE9I DATABASE SUMMARY (an Oracle white paper, May 2002). In this technique, the database servers of a plurality of systems are connected to one another, and update information on the DBMS running on one system is transferred to another system to duplicate data.

Another way to duplicate data in a similar system is to use a function to copy data between storage devices. For example, page 5 of a catalog for a Hitachi's integrated storage solution called "Storeplaza" describes the function to copy data between storage devices. Specifically, in this technique, the storage devices of a plurality of systems are connected to one another by way of a fiber channel, and if data on a disk drive of one storage device has been updated, the update is reflected in a disk drive of another storage device.

Implementing a conventional data duplicating method incurs cost higher than that for implementing an ordinary database application.

Furthermore, duplicating data between a plurality of systems in a synchronous manner causes a delay in the application processing.

To duplicate data by use of DBMSs, it is necessary to employ high-performance database servers since the database servers running the DBMSs must take up both the application processing load and the data duplication processing load, resulting in increased cost. Furthermore, to ensure that duplicated data coincides with the original data, synchronous communications must be carried out between the database servers whenever their DBMSs perform update processing. The DBMSs cannot perform subsequent update processing during the synchronous communications, causing a delay in the application processing.

To duplicate data by use of storage devices, on the other hand, it is necessary to connect between the storage devices by way of a broad band line since the entire updated data handled by each DBMS must be duplicated. Use of a broad band line increases the cost. Furthermore, to ensure that duplicated data coincides with the original data, synchronous communications must be carried out between the storage devices whenever data on the disk drives is updated. Subsequent update processing cannot be performed on the disk drives during the synchronous communications, causing a delay in the application processing.

To avoid the delay due to the synchronous communications, there is a method for asynchronously carrying out communications between DBMSs or storage devices. However, when switching to the system on the data duplicating side after a fault or a disaster has occurred (on the data originating side), the data duplicating side must recreate the data that has failed to be transferred, causing a delay in the switching of the systems.

SUMMARY OF THE INVENTION

When a server performs application processing in response to a received external request, it must update or add to data stored in its storage device. When duplicating such changes to the data stored in the storage device, the present invention does not copy the entire data. Instead, a server and a storage device is prepared on the data duplicating side. With this arrangement, a log based on which the application processing performed by the server on the data originating side can be repeated is stored on a specific disk drive on the data originating side, and copied to a disk drive of the storage device on the data duplicating side each time the log data on the disk drive on the data originating side is updated. After the log data on the disk drive has been copied to the storage device on the data duplicating side, a notification indicating that the log stored on the disk drive on the data duplicating side has been updated is sent to the server on the data duplicating side. The server on the data duplicating side is designed to be able to receive a notification of a change in the log data on the disk drive from the storage device, and reads the log, upon receiving the notification, and performs the same application processing as that performed by the server on the data originating side. After the application processing has been carried out based on the log, the result is reflected in the storage device, completing duplication of the data.

Consider that in a system currently executing the above data duplicating method, the server and the storage device on the data originating side have been shut down due to a failure or maintenance operation. In such a case, since the application data stored in the storage device on the data duplicating side is up-to-date, it can be arranged such that the server on the data duplicating side takes over the application processing currently being performed by the server on the data originating side and receives subsequent application processing requests in place of the server on the data originating side, thereby switching the servers and their storage devices without interrupting the current application processing.

After switching the servers and their storage devices, the server and the storage device on the original data originating side performs the functions of the data duplicating side after their operations are resumed. With this arrangement, the severs and their storage devices can be switched again when the system currently receiving application processing requests has failed.

DETAILED DESCRIPTION OF THE PREFERRED EMBODIMENTS

The preferred embodiments described below are explained as applied to databases and database servers. However, the present invention can be applied to any application running on a computer in which a primary system performs application processing and thereby updates stored data whereas a secondary system duplicates the updated data based on a log generated by the primary system. For example, the present invention may be applied to file systems.

First Embodiment

Figure 1:
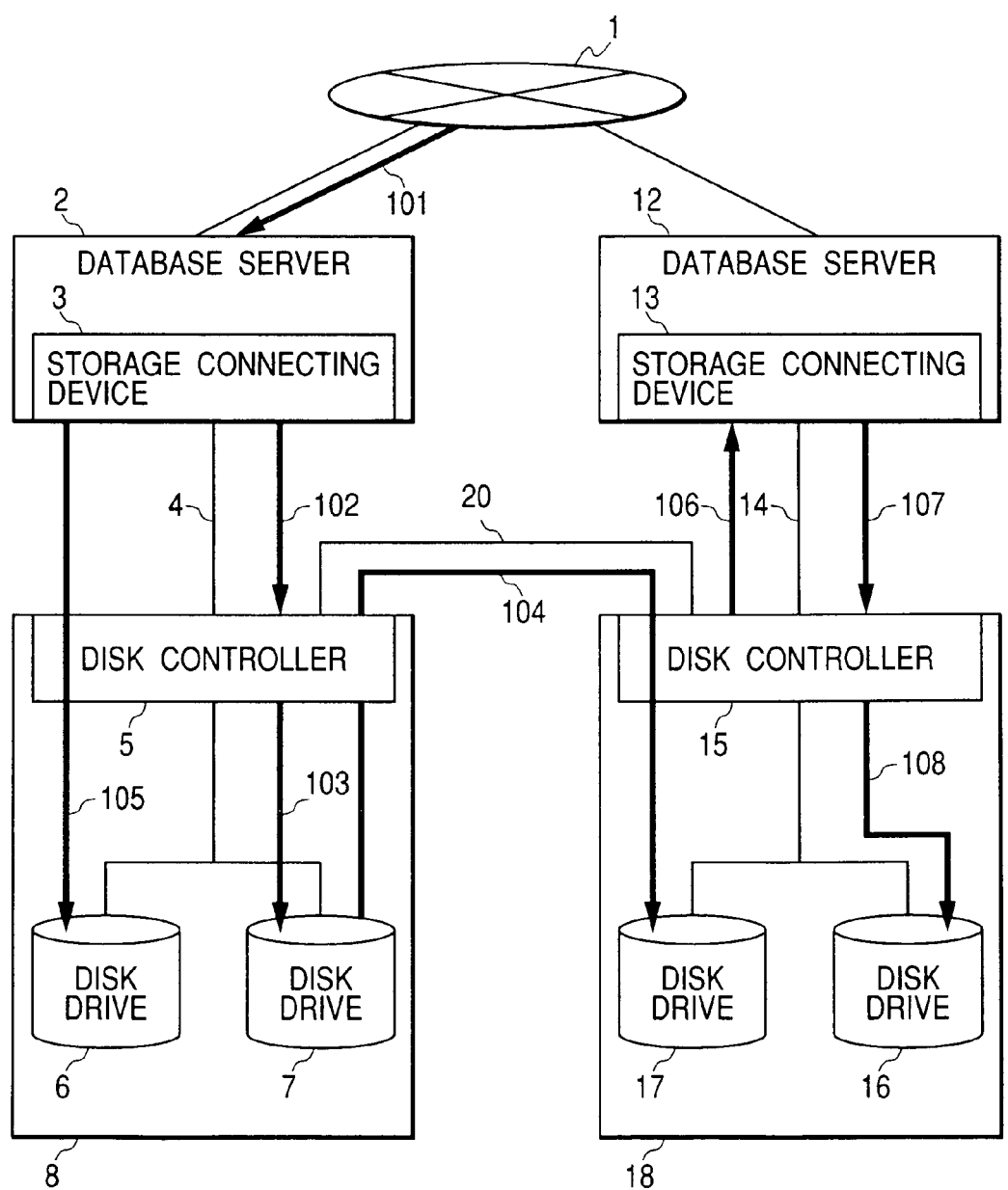
FIG. 1 is a diagram conceptually showing a data duplicating system comprising a primary system and a secondary system, and a data duplicating method for duplicating data between the primary system and the secondary system.

FIG. 1 shows a data duplicating system using database servers and storage devices according to a first embodiment of the present invention.

The primary system is made up of a database server 2 and a storage device 8. The storage connecting device 3 incorporated in the database server 2 and the disk controller 5 of the storage device 8 are connected to each other by way of a server/storage connecting interface 4. The storage device 8 incorporates disk drives 6 and 7 which store data to be read and written by the disk controller 5. The storage device 8 stores: data processed by the database server 2 according to an application request received through an application network 1; data necessary for the above processing; and application data processed within the database server 2.

Not only does the database server 2 write/read data to/from the storage device 8 through the server/storage connecting interface 4, but when the data on one of the disk drives 6 and 7 specified by the database server 2 has changed, the storage device 8 notifies the database server 2 of the change.

The secondary system is made up of a database server 12 and a storage device 18. The storage connecting device 13 incorporated in the database server 12 and the disk controller 15 of the storage device 18 are connected to each other by way of a server/storage connecting interface 14. The storage device 18 incorporates disk drives 16 and 17 which store data to be read and written by the disk controller 15. The storage device 18 stores: data processed by the database server 12 according to an application request received through the application network 1; data necessary for the above processing; and application data processed within the database server 12.

Not only does the database server 2 write/read data to/from the storage device 18 through the server/storage connecting interface 14, but when the data on one of the disk drives 16 and 17 specified by the database server 12 has changed, the storage device 18 notifies the database server 12 of the change.

The disk controllers 5 and 15 are connected to each other by way of an inter-storage connecting interface 20, thereby interconnecting the storage device 8 of the primary system and the storage device 18 of the secondary system. One of the disk drives of the storage device 8 may be set as the data originating disk drive, and one of the disk drives of the storage device 18 may be set as the data duplicating disk drive, beforehand. With this arrangement, data can be duplicated through the inter-storage connecting interface 20.

Description will be made below of the operations of a data duplicating method and a system switching method according to the present embodiment. The present embodiment assumes that data is duplicated between a primary system, which usually performs application processing, and a secondary system, which takes over the application processing from the primary system when the primary system has become inoperative for some reason.

First of all, the initial settings of both the primary and the secondary systems are established to implement the data duplicating method.

The setting of the primary system begins by creating a database for a target application system. The disk drives 6 and 7 are assigned to the database server 2 by use of the disk controller 5 of the storage device 8 so that they can be used by the server. The database server 2 sets the disk drive 6 for storing data for the database and the disk drive 7 for storing logs for the database. The logs indicate each update operation carried out on the database, making it possible to recreate the updated database based on the logs. For example, the logs include logs of transactions conducted through the database and the SQL commands for all application requests received by the database server. A transaction is a unit of work and here made up of a plurality database operations. If one of the plurality of operations fails, so does the entire transaction. An application system which must process a large number of application requests performs processing in transactions so as to avoid causing any inconsistency in the database.

A database similar to that for the primary system is created for the secondary system. The disk drives 16 and 17 are assigned to the database server 12 by use of the disk controller 15 of the storage device 18 so that they can be used by the server. The disk drives 16 and 17 are similar to the disk drives 6 and 7 in storage device 8 which are made available to the database server 2. The database server 12 sets the disk drive 16 for storing data for the database and the disk drive 17 for storing logs for the database, as is the case with the database server 2.

Then, settings are established such that the database log data on the disk drive 7 in the storage device 8 of the primary system can be copied to the disk drive 17 in the storage device 18 of the secondary system through the inter-storage connecting interface 20. This disk drive copy operation may be carried out either synchronous copy operation or asynchronous copy operation. Specifically, in the synchronous copy operation, a write completion notification is issued to the database server 2 after the information write operations to both the disk drive 7 and the disk drive 17 have been completed in response to an information write request sent from the database server 2 to the disk drive 7. The asynchronous copy operation is different from the synchronous copy operation in that in the asynchronous copy operation, a write completion notification is issued to the database server 2 at the time point at which the information write operation to the disk drive 7 has been completed. However, if the disk drive copy operation is asynchronously performed, the data on the log disk of the primary system does not necessarily coincide with that on the log disk of the secondary system, which may cause data loss at the time of switching the systems.

Settings are further established such that the database server 12 of the secondary system notifies the disk controller 15 of the storage device 18 when the data on the disk drive 17 has been updated.

To switch to the secondary system in case of a failure or a disaster in the primary system, it is necessary to quickly detect the shutdown of the primary system. Therefore, a communications setting is made such that the database server 2 of the primary system can notifies the database server 12 of the secondary system of the operational state of the primary system. For example, the database server 2 of the primary system may send a notification to the database server 12 of the secondary system through the application network 1 at regular time intervals. Alternatively, an external server which monitors the operational state of the primary system may send an instruction for switching to the secondary system, or the secondary system may send an inquiry to the primary system about its operational state at regular time intervals.

After the database servers 2 and 12 and the storage devices 8 and 18 are set as described above, the database server 2 of the primary system begins to perform application processing. The data duplicating procedure will be described below.

First data duplicating step 101: The database server 2 receives an application processing request through the application network 1. The application processing request is sent on the application network according to a protocol and requests that the data managed by the database server 2 be referred to or updated. For example, the application processing request is made up of a combination of SQL commands or SQL query and sent according to a TCP/IP protocol.

Upon receiving the application processing request, the database server 2 analyzes the network protocol layer, extracts the command for the target application processing, analyzes it, and then performs the application processing on the database. For example, the database server 2 analyzes a TCP/IP protocol, extracts a SQL query, and executes the processing request on the database.

Second data duplicating step 102: If the application processing requires updating the database, the data stored in the storage device must be updated. In such a case, through the storage device connecting device 3 and the server/storage connecting interface 4, the database server 2 instructs the disk controller 5 of the storage device 8 to write an update log to the disk drive 7. This function is accomplished by, for example, attaching a host bus adapter to the database server 2 and transmitting a SCSI command to the disk controller through a fiber channel cable. The above update log write operation may not be carried out each time data is updated. It may be performed when each transaction is completed or when an input/output condition specified by the database server 2 has been met, such as that the log buffer set by the database server 2 is full, or that a predetermined time has elapsed. In FIG. 1 of the present embodiment, only a single write request is indicated, for simplicity. However, a write request to another disk drive is generally made up of a plurality of requests sent separately.

Third data duplicating step 103: Receiving the request for writing the update log, the disk controller 5 writes the information to the disk drive 7.

Fourth data duplicating step 104: It is arranged that after the update log has been written to the disk drive 7, the update log is copied to the disk drive 17 in the storage device 18 of the secondary system. Therefore, the disk controller 5 transmits the update log from the disk drive 7 to the disk controller 15 in the storage device 18 of the secondary system through the inter-storage device connecting interface 20, instructing the disk controller 15 to write it to the disk drive 17. In response, the disk controller 15 writes the update log to the disk drive 17. Upon completion of the write operation, the disk controller 5 notifies the database server 2 of completion of the update log write operation. This function can be accomplished by, for example, using a fiber channel cable as the inter-storage device connecting interface 20 and setting the disk drives 7 and 17 by use of the management software for each storage device such that the above copy operation can be carried out.

It should be noted that the present embodiment uses a synchronous copy method in which immediately after the data on the disk drive 7 is updated, the update data portion is copied to the disk drive 17. However, an asynchronous copy method may be employed in which copy operation is carried out at regular time intervals. It should be further noted that in the case of the asynchronous copy method, a write completion notification is sent to the database server 2 upon completion of the write operation to the disk drive 7 in the storage device 8 even when the write operation to the disk drive 17 has not been completed. This means that the data on the disk drive 7 might be yet to be copied at the time of switching the systems.

Fifth data duplicating step 105: Upon receiving the notification of the completion of the update log write operation, the database server 2 instructs the disk controller 5 to write updated processing data to the disk drive 6. In response, the disk controller 5 writes the updated processing data to the disk drive 6.

Sixth data duplicating step 106: After updating the log data on the disk drive 17, the disk controller 15 notifies the database server 12 of the update since the database server 12 has instructed the disk controller 15 to do so. The above update notification request and the update notification are accomplished by one of the following methods: the disk controller 15 sends the notification in response to a read request issued from the database server 12 to a specific disk drive 17 in the storage device 18; the disk controller 15 sends the notification in response to a special command indicating the update notification request sent from the database server 12 to the disk drive 17; and an interrupt interface dedicated for disk update notifications from the disk controller 15 is installed in the storage connecting device 13 of the database server 12. It should be noted that the notification from the disk controller 15 to the database server 12 may not be issued for each update. It may be sent at regular time intervals. Or alternatively, the instruction issued from the database server 2 to the storage device 8 is transferred to the storage device 18, and the disk controller 15 is instructed to further transfer the notification to the database server 12.

Seventh data duplicating step 107: Receiving the notification of the update of the log data on the disk drive 17, the database server 12 sends an information write request to the disk controller 15 through the storage connecting device 13 and the server/storage connecting interface 14, instructing the disk controller 15 to read the updated portion of the log data from the disk drive 17 and update the processing data stored on the disk drive 16 based on the updated log. The above function is accomplished by, for example, attaching a host bus adapter to the database server 12 and transmitting a SCSI command to the disk controller through a fiber channel cable.

Thus, each time the database server 2 of the primary system processes an application processing request, the data created or updated in the primary system is duplicated in the secondary system. This arrangement eliminates the need for imposing a load on the database server 12 and transmitting data through the application network 1 for data duplication, which reduces the data transmission rate between the storage devices 8 and 18, the data duplication cost, and the delay in the application processing.

Figure 2:
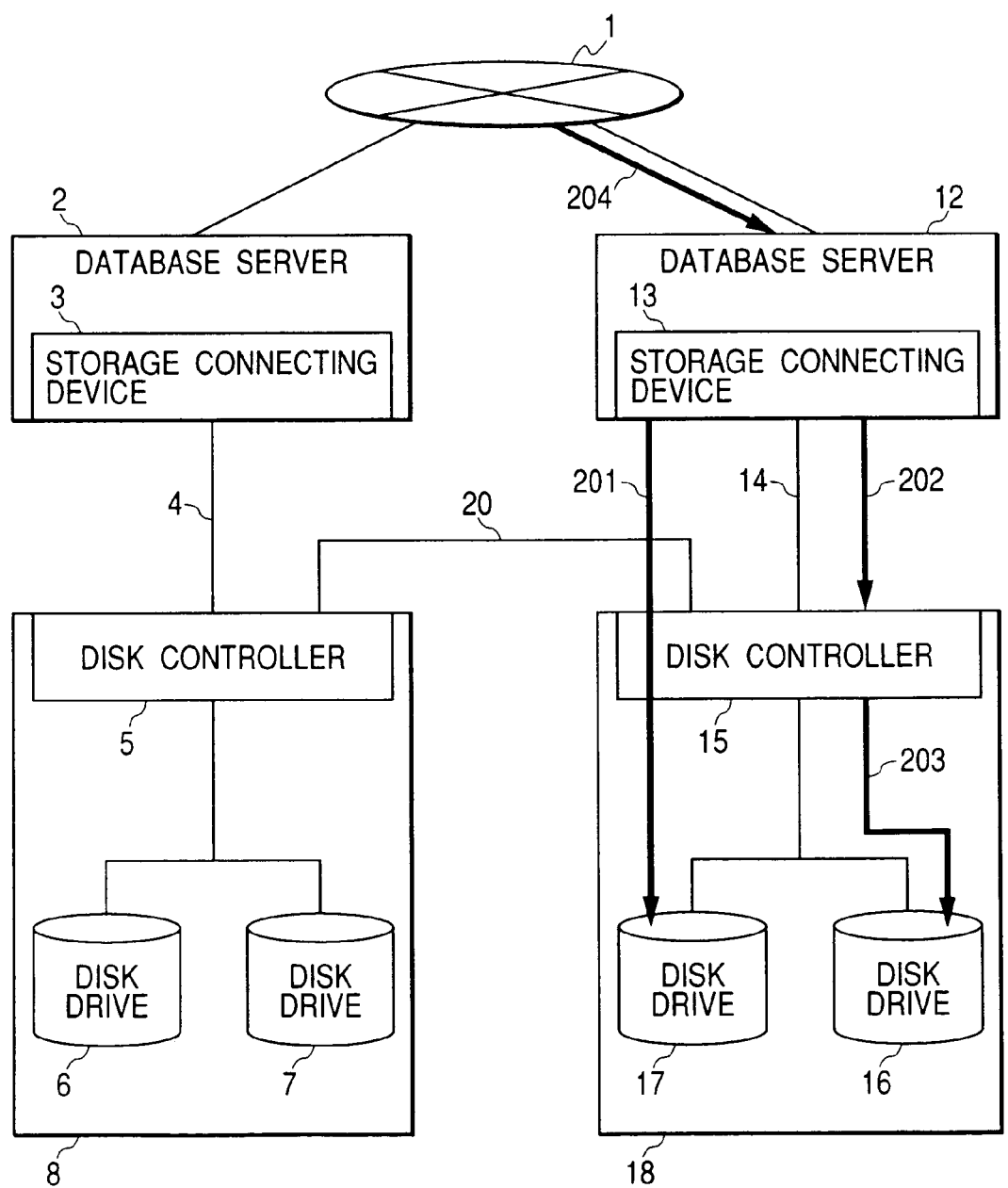
FIG. 2 is a diagram conceptually showing a data duplicating system comprising a primary system and a secondary system, and a system switching method for switching between the primary system and the secondary system.

When the primary system has been shut down due to a disaster or a fault in the equipment, the secondary system takes over the current application processing. The primary system also may be shut down when it is necessary to perform maintenance work on the system, requiring that the secondary system perform the application processing in place of the primary system. FIG. 2 shows a processing procedure in which the secondary system takes over application processing from the primary system after the primary system is shut down. Since the system configuration is the same as that shown in FIG. 1, its explanation will be omitted. The processing for taking over the application processing is carried out as follows.

When the primary system has been shut down, the systems are switched such that the database server 12 and the storage device 18 of the secondary system takes over the application processing. The shutdown of the primary system can be detected by means of, for example, heartbeat communication in which the database servers 2 and 12 communicate with each other at regular time intervals or which is carried out by a monitoring server other than the database servers 2 and 12 connected to the application network 1.

The takeover of the application processing can be accomplished by changing the system arrangement such that the database server 12 receives application processing requests in place of the database server 2. For example, the database server 12 may take over the network address used by the database server 2 to receive application processing requests.

First system switching step 201: After instructing the storage device 18 to stop any information write operation from the disk drive 7 to the disk drive 17, the database server 12 checks the log data on the disk drive 17 to determine whether there is any remaining application processing. The reason why the write operation from the disk drive 7 to the disk drive 17 is interrupted is that since it is uncertain whether the database server 2 is properly operating, some write operation to the disk drive 7 may not have been properly carried out. Such write operation to the disk drive 7 should not be reflected in the secondary system which is to take over the application processing.

At second system switching step 202: If there is any remaining application processing, the database server 12 sends an information write request to the disk controller 15 through the storage connecting device 13 and the server/storage connecting interface 14, instructing the disk controller 15 to perform the remaining application processing and update the processing data on the disk drive 16. However, if the database server 2 does not write logs to the disk drive 7 on a transaction basis, there may not be enough logs on the disk drive 17 to indicate some transaction. In such a case, the database server 12 must update the data in order to cancel the data update due to the transaction lacking in logs.

At third system switching step 203: The disk controller 15 writes information to the disk drive 16 according to the request.

At fourth system switching step 204: After the information has been written to the disk drive 16, the database server 12 accepts an application request and begins to perform application processing.

For the case where the primary system has recovered from a failure or a disaster and resumed its operation or the primary system has become operative after completion of maintenance work, the above data duplicating method of the present embodiment may be modified such that the data created or updated in the secondary system is copied to the primary system (the data flow direction is opposite to that described above). With this arrangement, the processing data and logs produced when the secondary system performed application processing while the primary system was not in operation can be reflected in the primary system.

For example, settings may be established such that the updated portion of the log data on the disk drive 17 in the storage device 18 is copied to the disk drive 7 in the storage device 8, and the database server 2 updates the processing data on the disk drive 6 based on the updated log, thereby copying the data in the secondary system to the primary system. Thus, unless the primary system and the secondary system shut down at the same time, the data duplicating method of the present invention can be continuously applied if the primary system fails, the secondary system takes over the application processing, and vice versa, making it possible to reduce the time during which the entire system is at a halt no application processing is carried out.

Further, the present embodiment was described as applied to an arrangement in which only a single primary system and a single secondary system are employed. However, the present embodiment can easily be configured such that it can be applied to an arrangement in which data in a single primary system is copied to a plurality of secondary systems, or data copied from a primary system to a secondary system is further copied to another secondary system.

FIGS. 3 to 6 are flowcharts showing the processing procedures performed by the database servers and the storage devices which are major components of the present embodiment. Each flowchart will be described below.

Figure 3:
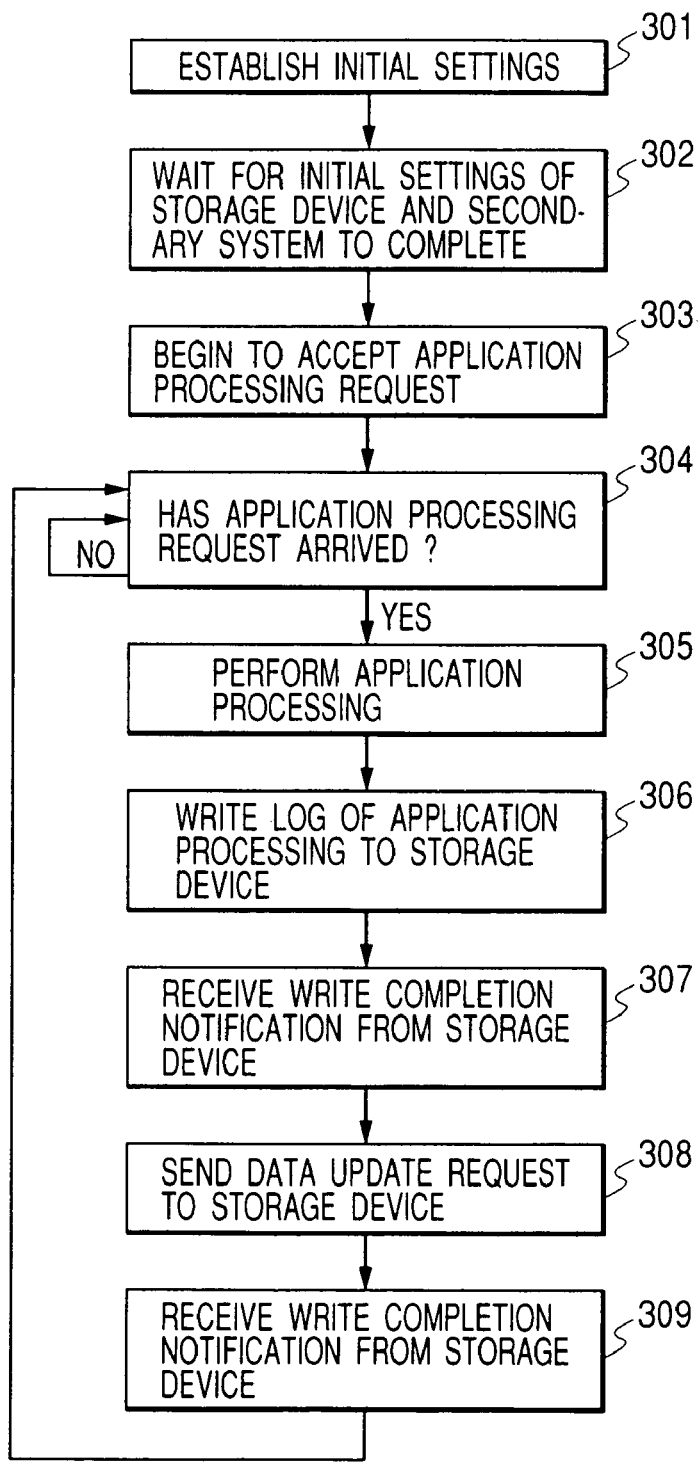
FIG. 3 is a flowchart showing the processing procedure performed by the database server of a primary system.

Description will be made of the flowchart of in FIG. 3 which shows the processing procedure performed by the database server of the primary system.

First of all, the initial settings for the database server are established at step 301. The initial settings include creation of a database, assignment of disk drives, etc.

At step 302, the database server waits for the creation of the data duplicating system to complete waiting for the initial settings for the storage device and the secondary system to be established. For example, the database server waits for the disk copy setting between the storage devices and the creation of the database of the secondary system to complete.

After the initial settings for the data duplicating system have been established, the database server begins to accept a application processing request at step 303. The types of application processing include, for example, management of goods dealt with through the Internet.

After beginning to accept an application processing request, the database server determines whether an application processing request has arrived at step 304.

If an application processing request has arrived, the database server performs the application processing at step 305. If an application processing request has not arrived, on the other hand, the database server waits for the arrival while repeating the above determination at step 304. If an application processing request has arrived and the requested application processing requires a data update, the database server writes a log of the application processing to its storage device at step 306. At step 307, the database server receives a log write completion notification. After that, the database server sends a data update request to the storage device at step 308.

The database server receives a write completion notification sent by the storage device in response to the above data update write request at step 310, completing the processing of the application processing request.

As described above, once the primary system operates, it repeats processing of an application processing request and updating of the log and the data as required by the processing.

Figure 4:
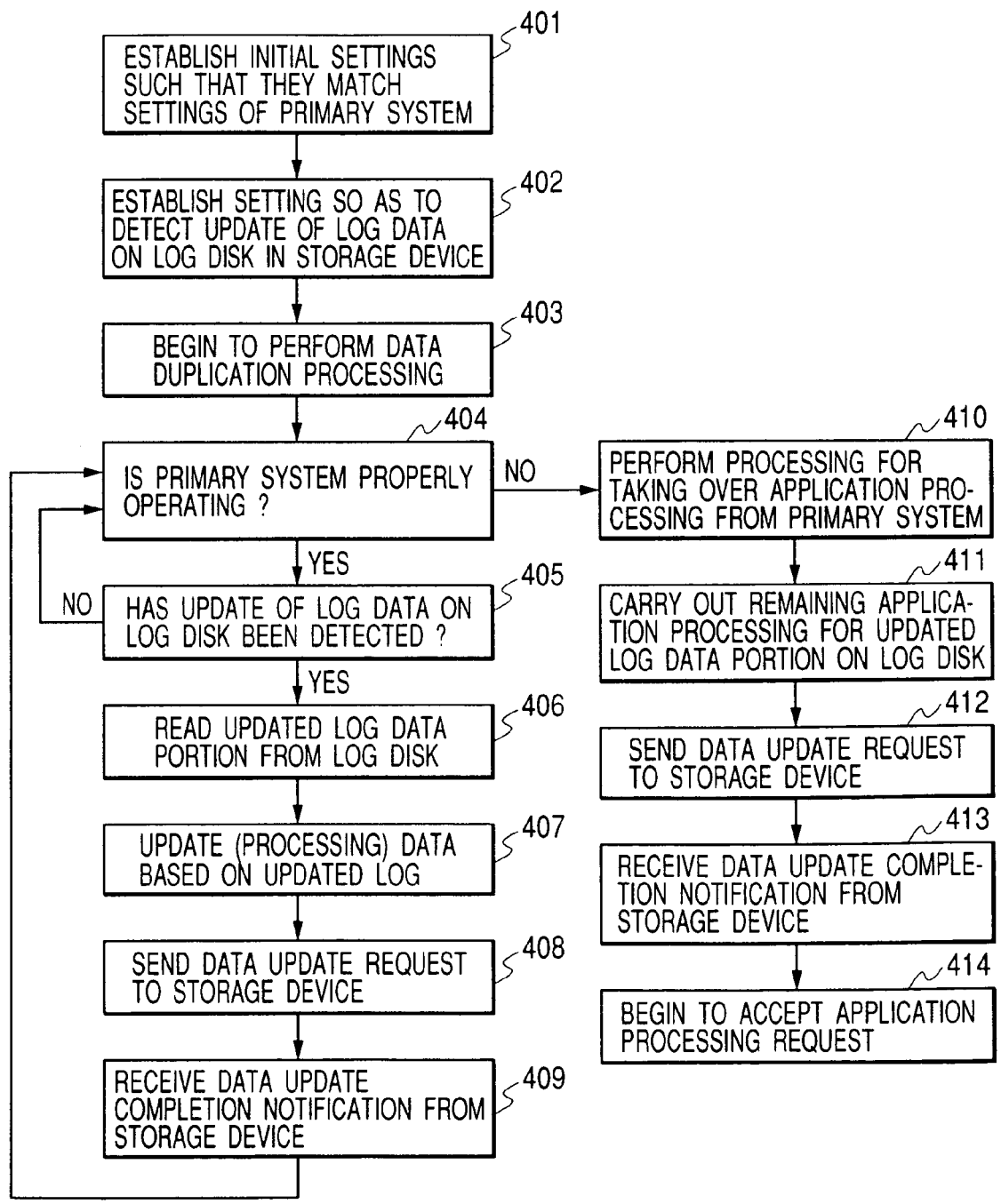
FIG. 4 is a flowchart showing the processing procedure performed by the database server of a secondary system.

Description will be made of the flowchart of FIG. 4 which shows the processing procedure performed by the database server of the secondary system.

Since the purpose of this data duplicating system is to enable the secondary system to perform application processing in place of the primary system when the primary system has been shut down, the initial settings for the database server of the secondary system are established such that they match the settings of the primary system at step 401. For example, a disk for copying a log, a data disk, etc. must be prepared to duplicating data.

In order to check the log copied from the primary system, the database server of the secondary system is set such that it can detect the update of the log data on the log disk in the storage device at step 402. This may be accomplished in such a way that the database server of the secondary system instructs the storage device of the secondary system to notify the server of the update of the log data on the log disk, or the database server of the secondary system regularly reads the log data on the log disk in the storage device to determine whether it has been updated. These arrangements allow detecting the update of the log.

When the log has been updated, the database server updates the data in the database of the secondary system based on the updated log. The database server begins to perform data duplication processing.

At step 404, the database server checks whether the primary system is properly operating to determine whether it is necessary to switch the systems. For example, a rule may be established: the systems are switched if an operational state notification has not arrived for 10 seconds; or an operational state monitoring server other than those of the primary and the secondary systems is connected to the application network for monitoring the operational state and when the operational state monitoring server has determined that the primary system is not operating, the secondary system takes over the application processing. Then, whether the systems should be switched is determined based on this rule. It should be noted that since there may be other ways of determining the operational state of the primary system, the present invention is not limited to the above methods.

If it is determined that the primary system is not properly operating, the systems are switched. The database server first performs the processing for taking over application processing from the primary system at step 410 to connect with the application network. Then, the database server performs the remaining application processing for the updated portion of the log data on the log disk at step 411 and then sends a data update request to the storage device at step 412. The database server assumes that the data in the primary system has been duplicated when it has received a data update completion notification from the storage device at step 413. After the data produced by the remaining application processing for the update portion of the log data on the log disk has been reflected in the storage device, the database server begins to accept an application processing request at step 414.

If it is determined that the primary system is properly operating, on the other hand, the database server determines at step 405 whether the update of the log data on the log disk in the storage device has been detected. The detection of the update of the log data on the log disk is accomplished in such a way that: the storage device issues an interrupt to the database server; the storage device responds to a specific I/O command issued from the database server to the storage device; or the database server reads the log data on the log disk at regular time intervals and analyzes the information. If the update of the log data on the log disk has been detected, the database server reads the updated log from the log disk at step 406 and updates processing data based on the updated log at step 407. Furthermore, at step 408, the database server sends a data update request to the storage device, instructing the storage device to save the above updated processing data in order to duplicate the entire updated data held in the primary system. At step 409, the database server receives a data update completion notification from the storage device. The database server repeats the processing for receiving an operational state notification and waiting for an update notification from the storage device to duplicate data, preparing for system switching.

Figure 5:
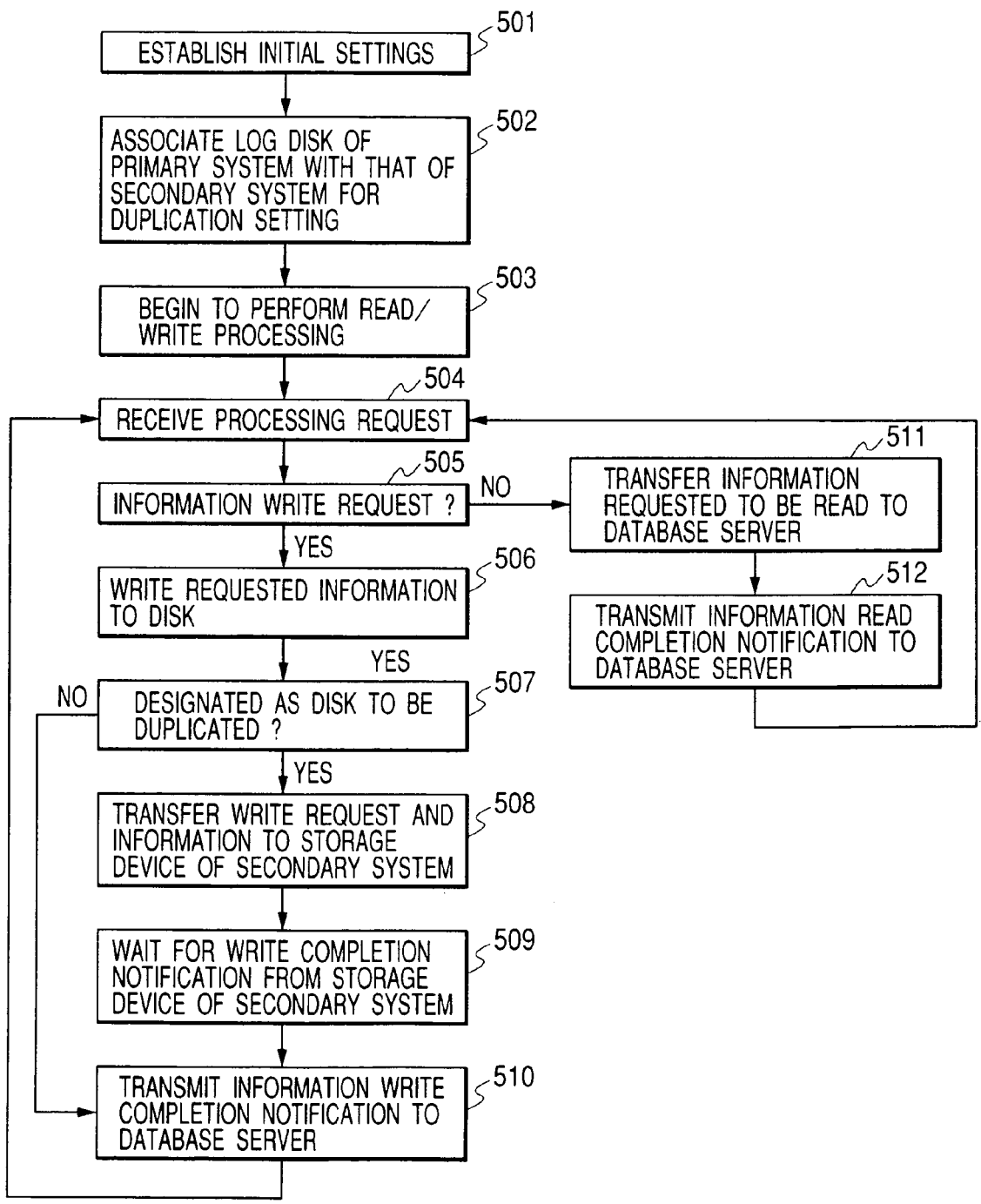
FIG. 5 is a flowchart showing the processing procedure performed by the storage device of a primary system.

Description will be made of the flowchart of FIG. 5 which shows the processing procedure performed by the storage device of the primary system.

First of all, the initial settings are established at step 501, including assigning disk drives in the storage device to the database server.

To implement the data duplicating method of the present embodiment, the log disk of the primary system is associated with that of the secondary system so that data can be duplicated, at step 502. It should be noted that the initial settings for the database server and the storage device of the secondary system must be established before this step.

After completing the settings, the storage device begins to perform read/write processing at step 503, accepting a data update request from the database server.

Upon receiving a processing request at step 504, the storage device determines whether it is a write request at step 505. If it is not a write request, the storage device transfers the information requested to be read to the database server at step 511 and transmits an information read completion notification to the database server at step 512. It should be noted that the storage device also receives a disk drive control request, etc. In the above description, however, these requests are regarded as read requests. If the storage device has received a write request, on the other hand, the storage device writes the requested information to a disk at step 506 and determines whether the disk is set to be duplicated at step 507. If it is determined that the disk is not to be duplicated, the storage device transmits a data write completion notification to the database server at step 510. If the disk is to be duplicated, the storage device transfers the write request and the information to the storage device of the secondary system at step 508 and waits for a write completion notification from the storage device of the secondary system at step 509. Upon receiving the completion notification from the secondary system, the storage device transmits an information write completion notification to the database server at step 510. It should be noted that in the above method, data is copied synchronously between the primary system and the secondary system.

Thus, the storage device of the primary system repeats processing for waiting for a processing request from the database server, reading/writing information from/to disks, and copying data to a disk of the secondary system.

Figure 6:
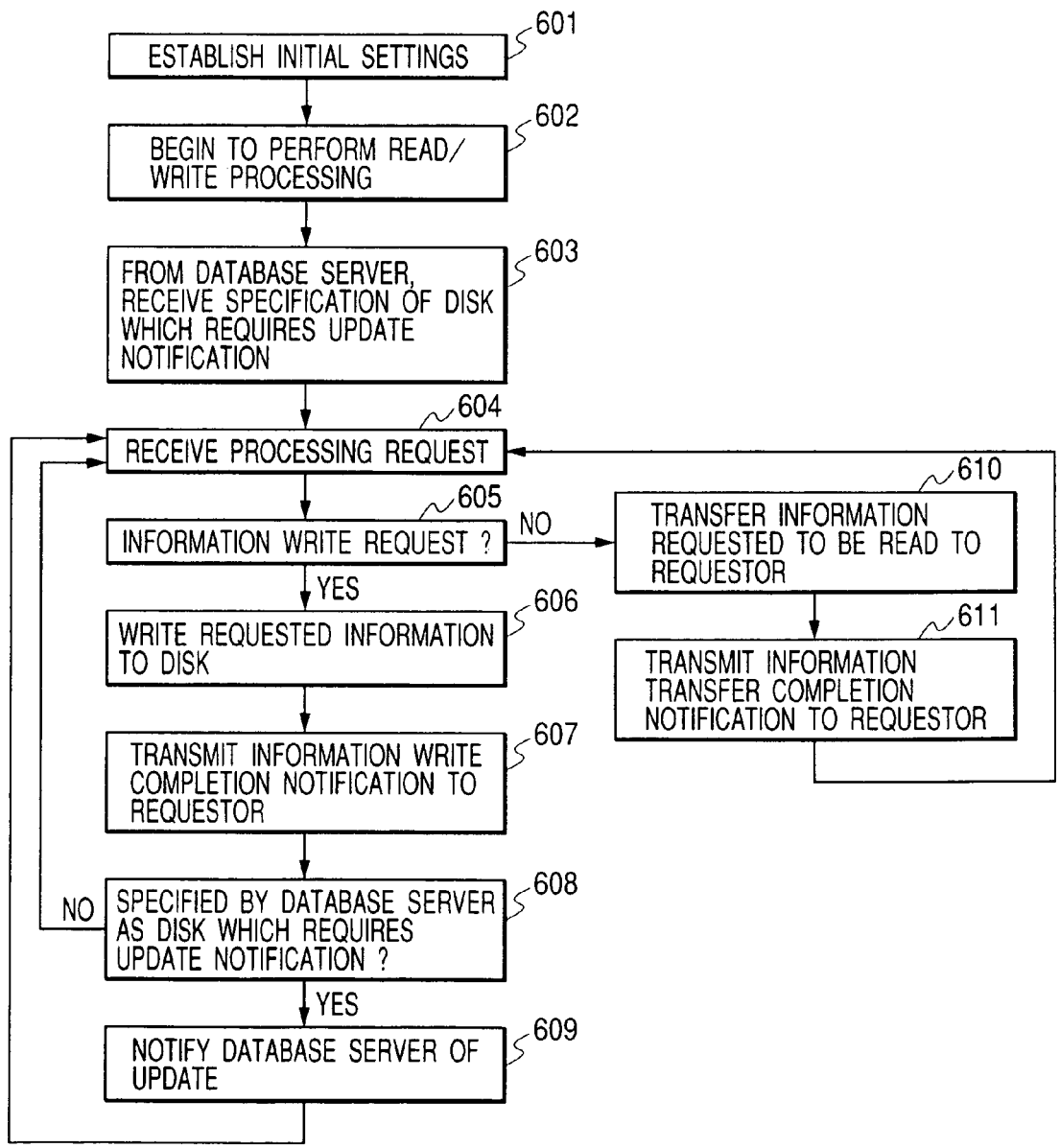
FIG. 6 is a flowchart showing the processing procedure performed by the storage device of a secondary system.

Description will be made of the flowchart of FIG. 6 which shows the processing procedure performed by the storage device of the secondary system.

First of all, the initial settings are established at step 601, including assignment of disk drives in the storage device to the database server and disk copy setting from an external storage device.

The storage device begins to perform read/write processing at step 602, prepared to accept a request from the database server. At step 603, the storage device receives specification of a disk for which an update notification is issued from the database server, completing the preparation for duplicating data.

At step 604, the storage device begins to receive a processing request. Upon receiving a processing request, the storage device determines whether it is a write request at step 605. If it is not a write request, the storage device transfers the information requested to be read to the requester at step 610 and transmits an information transfer completion notification to the requester at step 610, completing the processing of the request. If the storage device has received a write request, on the other hand, the storage device writes the requested information to a disk at step 606 and transmits an information write completion notification to the requester at step 607. Processing of an ordinary processing request is completed at this step. However, when a write operation to a disk is requested to duplicate data, the storage device determines at step 608 whether the disk has been specified by the database server as requiring an update notification. If it is the specified disk, the storage device notifies the database server of the update at step 609. If it is not the specified disk, on the other hand, the processing ends without issuing any update notification.

The storage device of the secondary system repeatedly processes a log disk write request from the primary system and read/write requests from the database server of the secondary system and transmits an update notification if the target disk has been specified as requiring the notification, as described above, in order to perform data duplication processing.

According to the data duplicating method of the present embodiment, the functions of the primary system and the secondary system are switched such that the secondary system performs application processing in place of the primary system when the primary system has been shut down. This arrangement can reduce the delay due to the system switching by synchronously carrying out disk copy operation between the storage devices 8 and 18 since all the logs necessary for the data duplication can be copied.

Second Embodiment

The first embodiment requires an interface other than an ordinary disk drive read/write interface to notify a database server of the update of the data on a disk drive. The second embodiment described below, on the other hand, only uses a disk drive read/write interface to duplicate data. The configuration of the data duplicating system of the second embodiment is the same as that of the first embodiment shown in FIG. 1.

According to the first embodiment, the secondary system is arranged such that the database server 12 is notified of the update of the data on the disk drive 17. In the present embodiment, on the other hand, the database server 12 monitors the disk drive 17 by polling in order to detect an update.

A data update is detected as follows. The database server 12 memorizes the position on the disk drive 17 at which the next log is to be written and periodically reads data from that position to determine whether it has been updated. If the data has been updated, the database server 12 performs application processing based on the log. Upon completion of the application processing, the database server 12 updates the position at which the next log is to be written. The database server 12 repeatedly reads data from the position and determines whether it has been updated.

The update logs for a database are generally written in a predetermined area one after another such that they do not overlap one another. When the end of the area has been reached, the subsequent update logs are written over the previous update logs in the area from the start position sequentially again. Therefore, if the database server can read the update logs before they are overwritten and distinguish one update log from another, the data on the data disk drive can be updated through monitoring by polling, thereby duplicating the data.

In the above method in which a database server monitors the update of the log data on a disk drive through monitoring by polling in order to duplicate data, the delay due to the system switching can be reduced by sufficiently reducing the polling interval. Further, since the system configuration of the second embodiment is the same as that of the first embodiment, the cost for duplicating data can be reduced as compared with conventional methods. Still further, the delay due to the system switching can be further reduced by synchronously carry out disk copy operation between the storage devices 8 and 18 since all the logs necessary for the data duplication can be copied.

Third Embodiment

The first and second embodiments assume that the database servers 2 and 12 and the storage devices 8 and 18 are connected to one another directly or through a storage area network. The third embodiment, on the other hand, uses network attached storage (NAS) devices as the storage devices. The system configuration of the data duplicating system of the third embodiment is also the same as that of the first embodiment shown in FIG. 1.

The present embodiment is different from the first and second embodiments in the disk duplicating method between the storage devices. Since NAS devices accept an access request in a file system, the inter-storage connecting interfaces for the disk controllers 5 and 15 access them on a file basis. Therefore, the disk controller 5 must detect the update of the log file managed by the database server 2, instead of detecting the update of the log data on the disk drive 7. To detect the update, the disk controller 5 runs a daemon thereon for periodically monitoring a log file update, and when the update has occurred, the disk controller 5 copies the file to the disk drive 17 through the inter-storage connecting interface. It should be noted that the interface of the secondary system for issuing a log update notification is also different from those for the first and second embodiments described above. The disk controller 15 runs a daemon thereon for detecting a log file update. The database server 12 runs a process thereon for communicating with this daemon so that the server is notified when a log file update has occurred. Or alternatively, the above method of the second embodiment in which the database server 12 monitors the occurrence of a data update by polling may be applied to the log file.

Another method for duplicating log data is to install, in addition to the disk controllers 5 and 15, disk controllers capable of detecting a data update on a disk drive basis in the storage devices 8 and 18. With this arrangement, the log data on a disk is updated duplicated between the added disk controllers. In this case, log data is copied from the disk drive 7 to the disk drive 17, as in the first embodiment, through the added disk controllers. The database server 12 can be notified of a log data update by use of a method in which a daemon on the disk controller 15 communicates with a process on the database server, or the database server 12 monitors the occurrence of a log data update by polling, as described above.

When a log file is copied using NAS devices, the entire log file must be transferred between the storage devices 8 and 18. The total data transfer amount of the update logs can be reduced by creating a directory for holding logs and putting each log in the directory as a single file. The database uses the date and time on which each update log was written to create its file name. This arrangement makes it possible to uniquely identify each log. Furthermore, the logs created a predetermined length of time or longer before are deleted, making it possible to ensure that new logs are duplicated without exhausting the disk drive space. A log data update is notified to the database server 12 as described above. However, the daemon on the disk controller 15 for monitoring the occurrence of a log update monitors the files under the log directory, and if a new file has been created, the daemon notifies the process on the database server 12 of the creation. Also in the case where the database server 12 runs the daemon thereon for monitoring the occurrence of a file update by polling, the daemon monitors whether a new file has been created under the log directory.

A system configured as described above can duplicate data. The system configuration of the present embodiment is the same as that of the first embodiment, making it possible to reduce the cost and the delay due to the system switching.

Fourth Embodiment

Figure 7:
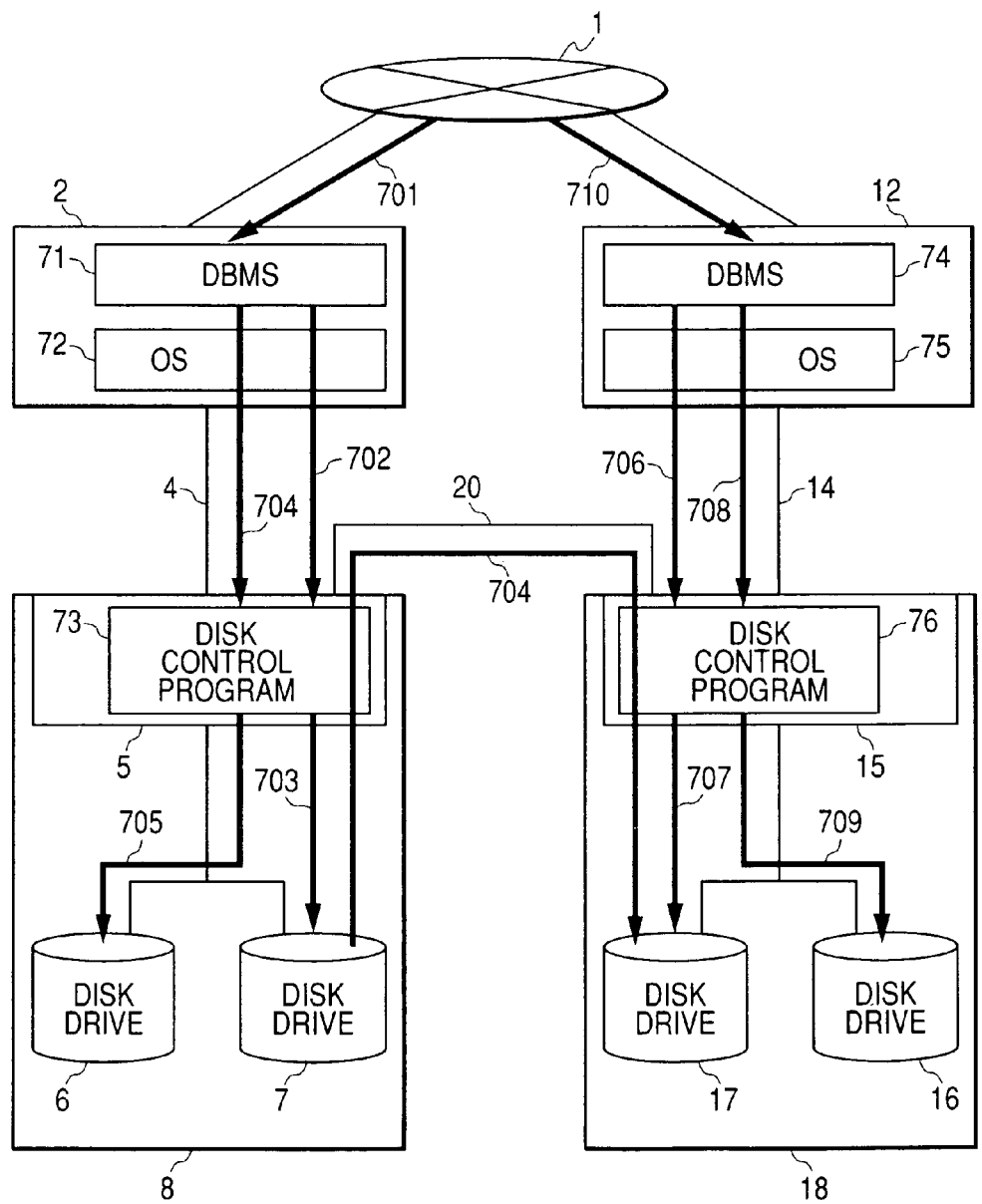
FIG. 7 is a diagram conceptually showing a data duplicating system comprising a primary system and a secondary system, and a system switching method for switching between the primary system and the secondary system.

FIG. 7 shows a data duplicating system employing database servers and storage devices and software programs running thereon according to an embodiment of the present invention. The present embodiment assumes that the application program running on each server is a DBMS. However, the present invention can be applied to any program which outputs an update of data as a log, for example, a transaction monitor.

The configuration of the data duplicating system is similar to that for the first embodiment shown in FIG. 1. However, FIG. 7 omits the storage connecting devices 3 and 13 from the database servers 2 and 12. An OS 72 and a DBMS 71 run on the database server 2, while an OS 75 and a DBMS 74 run on the database server 12. The OSs 72 and 75 provide the operational environments for the hardware control programs and application programs on the databases 2 and 12. The DBMSs 71 and 74 are application programs for performing application processing in the systems. Furthermore, control software programs 73 and 76 for receiving a request from the database servers 2 and 12 and updating the data on the disk drives 6 and 7 run on the disk controllers 5 and 15 of the storage devices 8 and 18, respectively. The functions of the storage connecting devices 3 and 13 of the first embodiment are accomplished by functions of the DBMSs 71 and 74 and the OSs 72 and 75 (the processing performed through the storage connecting devices 3 and 13 in the first embodiment is performed internally by the DBMSs 71 and 74 and the OSs 72 and 75).

The present embodiment includes the same system arrangement as that in the second embodiment, in which each device and each software program running on the device collectively accomplish data duplication. That is, the present embodiment does not have an interface through which the storage device 18 notifies the database server 12 of a change in information stored on the disk drives 16 and 17.

The OS 72 running on the database server 2 of the primary system can write/read information to/from the disk drives 6 and 7 within the storage device 8. The control software program 73 performs processing for copying information to the disk drives 6 and 7, transferring information to the OS 72, etc. in response to a request sent from the OS 72 through the server/storage connecting interface 4. The DBMS 71 runs on the OS 72 to perform application processing for the system. The secondary system is configured in the same way as the primary system such that the database server 12 and the storage device 18, and the OS 75 and the DBMS 74 running on the database server 12, and the control software program 76 can perform the same processing as that performed by the corresponding components of the primary system.

The control software programs 73 and 76 can transfer data on disk drives controlled by them to each other as well as copying information to a specified disk drive. For example, remote copy operation or synchronous copy operation may be used to accomplish the above function.

First of all, the initial settings of the primary system and the secondary system are established. In the primary system, the disk drives 6 and 7 within the storage device 8 recognized by the OS 72 are designated as the data disk and the log disk of the DBMS 71, respectively. In the secondary system, on the other hand, the disk drives 16 and 17 within the storage device 18 recognized by the OS 75 are designated by the DBMS 74 as the data disk and the log disk, respectively, in an arrangement corresponding to that for the primary system. Furthermore, the DBMSs 71 and 74 check each other's operational state in order for the secondary system to take over the application processing when the primary system has been shut down.

The initial setting of the storage devices 8 and 18 are established such that an update of information stored on the disk drive is copied to the disk drive 17. With this arrangement, a log of the processing performed by the DBMS 71 can be copied to the secondary system so that it can be checked by the DBMS 74. This copy operation may be carried out synchronously or asynchronously. However, the asynchronous copy operation cannot ensure that all the logs produced until the primary system has been shut down can be transferred. The synchronous copy operation, on the other hand, can ensure that all the logs produced until the primary system has been shut down can be checked to in the secondary system, making it possible to accurately duplicate data at high speed.

After the above settings are completed, a duplicate of data in the primary system can be created in the secondary system by use of the following procedure. First of all, the primary system begins its service. The DBMS 71 performs processing upon receiving an application processing request from the application network 1. By use of a function of the OS 72, the DBMS 71 instructs the control software program 73 to write a log of the processing to the disk drive 7, at step 702, so that the processing can be performed again based on the log. It should be noted that the application processing requests include requests for processing to be performed in the database server 2 for database creation or maintenance, in addition to those received from the application network. To fully carry out data duplication, it is necessary to create logs of all the received or processed application processing requests and write them to the disk drive 7.

The DBMS 71 may issue a log write request to the disk drive 7 on a committed-transaction basis, for example. Or alternatively, the DBMS 71 may issue a request for writing the contents of the log buffer held by the DBMS 71 to the disk drive 7 when the log buffer is full, or a predetermined time period has elapsed. In either case, the information stored on the disk drive 7 and that stored on the disk drive 17 must be synchronized coincide with each other in units in which the DBMS 71 issues requests to the disk drive 7 in order that all logs of the application processing performed by the DBMS 71 may be copied to the DBMS 74 of the secondary system without causing any mismatch between the data managed by the DBMS 71 and that managed by the DBMS 74. The following description assumes that the information stored on the disk drive 7 and that stored on the disk drive 17 are synchronized with each other. However, they need not necessarily be synchronized; information may be copied asynchronously from the disk drive 7 to the disk drive 17. It should be noted that the asynchronous copy operation cannot ensure that the logs in the primary system coincide with those in the secondary system, which may cause a mismatch between the data handled by the DBMS 71 and that handled by the DBMS 74 at the time of switching from the primary system to the secondary system. Therefore, it may be necessary to check or modify the data in the primary and the secondary systems.

Upon receiving a request, the control software program 73 writes the request log to the log disk drive 7 at step 703. Since an initial setting has been established such that the data on the disk drive 7 is copied to the disk drive 17, the control software program 73 transfers an updated portion write request to the control software program 76 through the inter-storage device connecting interface 20. Receiving the request, the control software program 76 writes the request (log) to the disk drive 17 at step 704. To carry out synchronous copy operation between the disk drives 7 and 17 at this step, a completion notification must be issued to the database server 2 after the information write operation to the disk drive 17 has been completed, and the DBMS 71 must perform the remaining application processing after receiving the notification. This arrangement allows logs of the application processing performed by the DBMS 71 to coincide with the duplicate logs stored in the secondary system. If, on the other hand, a completion notification is issued to the database server 2 after the information write operation to the disk drive 7 has been completed and the information copy operation to the disk drive 17 is carried out at an arbitrary time point irrespective of the time at which the request from the DBMS 71 is issued, the duplicate logs in the secondary system may not coincide with the original logs in the primary system since the information write operation is asynchronously carried out asynchronous copy operation.

To change data as required by application processing, the DBMS 71 sends a data change request to the control software program 73 using a function of the OS 72 at step 704. In response, the control software program 73 performs the requested information write/read operation on the disk drive 6 at step 705. It should be noted that the time point at which the DBMS 71 issues a log write request to the disk drive 7 or a data write requests to the disk drive 6 can be arbitrarily determined. For example, data to be written is stored in the data buffer managed by the OS 72, and a data write request may be issued regularly or when the data has not been used for longer than a predetermined period of time. To follow the application processing performed by the primary system, it is necessary to transfer all logs of the processing to the secondary system. As for the data, it is only necessary to maintain consistency (between the primary and the secondary systems) in terms of data used by the primary system for application processing.

On the other hand, the DBMS 74 of the secondary system sends a request to the control software program 76 using a function of the OS 75 at step 706 and reads the information stored on the disk drive 17 to determine whether it has been changed at step 707. If it is determined that the log data on the disk drive 17 has been changed, the DBMS 74 performs application processing based on the changed log and issues an information update request to the control software program 76 to update the data on the disk drive 16 of the secondary system at step 708. Receiving the request, the control software program 76 updates the data on the disk drive 16 at step 709. These steps are repeated at regular time intervals to update the data based on logs, copying the data in the primary system to the secondary system. It should be noted that as in the first embodiment, the server 12 may detect a log change by instructing the storage controller 15 or the control software program 76 to notify the server 12 when the information stored on the disk drive 17 has been changed.

There are a plurality of methods in which the DBMS 74 reads a changed log from the disk drive 17 and applies it to the data on the disk drive 16 to duplicate data. For example, if the DBMS 71 writes logs to the disk drive 7 on a committed-transaction basis, the DBMS 74 applies a log newly written to the disk drive 17 as it is. If the DBMS 71 writes logs to the disk drive 7 regardless of transaction commitments, on the other hand, the DBMS 74 may apply a new log as it is, or the DBMS 74 may manage a transaction management table which holds read logs and apply logs to the data after receiving a transaction commitment.

If the DBMS 74 has detected the shutdown of the DBMS 71 when the DBMSs 71 and 74 are monitoring each other's operational state, the settings are changed such that the DBMS 74 takes over application processing from the DBMS 71, at step 710. Before the DBMS 74 takes over the application processing, however, it is necessary to perform the recovery processing for ensuring consistency between the application data in the primary system produced as a result of the previous processing and the duplicate data in the secondary system. If logs have been copied from the disk drive 7 to the disk drive 17 synchronously on a committed-transaction basis, the DBMS 74 checks whether there are any logs on the disk drive 17 which have not been applied to the secondary system. If there are such logs, the DBMS 74 performs application processing based on the logs and issues an information update request to the control software program 76, at step 708. In response, the control software program 76 updates the information stored on the disk drive 16 at step 709. The recovery operation is complete when the control software program 76 has updated the data on the disk drive 16 for all the unprocessed logs on the disk drive 17. The DBMS 74 begins to perform application processing in such a way that the server 12 receives an application processing request from the application network 1.

The above recovery processing for ensuring consistency in the application data before switching from one system to the other to perform application processing is different depending on whether or not it is ensured that logs are written to the disk drive 17 on a commitment basis. It should be noted that write operation on a commit basis cannot be ensured when, for example, information is written before the commitment in a "checkpoint process", or information is written before the commitment due to an overflow of a buffer held by the DBMS 71. Description will be made below of recovery methods employed when write operation on a commitment basis is ensured and when such write operation is not ensured.

First, description will be made of recovery processing performed when log write operation is ensured on a commitment basis. When write operation on a commitment basis is ensured, it is only necessary to apply all the logs written to the disk drive 17 to the data. Therefore, the recovery is accomplished by checking the unprocessed logs on the disk drive 17 and rolling the logs forward. When synchronous copy operation is employed, since it is ensured that all information committed in the primary system is copied to the secondary system and furthermore the above recovery operation allows all copied logs to be applied, there is no transaction loss in the entire system.

When write operation on a commitment basis is not ensured, on the other hand, the data on the disk drive 7 includes both committed and uncommitted transaction logs. It should be noted that it is only necessary to ensure consistency of the data of the committed transactions. This is because the processing for the uncommitted transactions has not been reflected in the data in the primary system. Therefore, in the recovery operation, only the committed transactions are processed, and the uncommitted transactions are not processed. One of the following three recovery methods may be used to carry out such recovery operation.

For example, after all the logs written on the disk drive 7 be rolled is forward, the uncommitted transactions may be detected and then the detected uncommitted transactions may be rolled back. Specifically, the logs are scanned from the last log toward the first log to detect the uncommitted transactions. Or alternatively, the DBMS 74 may prepare a table for listing the statuses of transactions hereinafter referred to as a transaction management table and update them each time a log is written to the disk drive 17 and rolled forward before the shutdown of the DBMS 71 of the primary system is detected. In the latter case, it is only necessary to roll back the uncommitted transactions registered in the transaction management table in the recovery operation.

If a change in the log data is detected after the shutdown of the DBMS 71 of the primary system was detected, the statuses of the transactions may be checked before determining whether the log should be rolled forward. Specifically, after the committed transactions are rolled forward, the transactions obtained before the shutdown of the DBMS 71 was detected are checked for uncommitted transactions. If there are any uncommitted transactions, they are rolled back. More specifically, the uncommitted transactions may be searched for by scanning the logs from the log at the time point at which the shutdown of the DBMS 71 was detected to the last log, or using information of the management table.

Another recovery method is to roll forward only transactions which it is determined should be committed. For example, a transaction may be rolled forward when it has been given the uncommitted status in the above management table.

If one of the above three recovery methods to be applied to the case where write operation on a commitment basis is not ensured is used together with the synchronous copy method, there is no transaction loss in the entire system, since it is guaranteed that information written to a disk drive in the primary system is copied to the secondary system and furthermore the above recovery methods allow all committed transactions to be rolled forward.

Thus, a log of the application processing performed by the primary system is copied to the secondary system and the application data produced in the primary system is recreated based on the log, making it possible to reduce the communication bandwidth for transferring information between the primary and the secondary systems, thereby duplicating data at low cost. Furthermore, if synchronous copy operation is used to copy a log from the primary system to the secondary system, the data can be duplicated without any transaction loss, making it possible to quickly switch to the secondary system to perform application processing when the primary system should be shut down due to occurrence of a failure or maintenance.

As can be understood from the above description of the preferred embodiments, the present invention can duplicate data between a plurality of systems each including database servers and storage devices at low cost with a small delay in ordinary application processing. The present invention also can reduce the delay in switching the systems.

What is claimed is:

1. A data control method for duplicating data in a system which includes a primary system including a first computer system and a first storage device connected to said first computer system, and a secondary system including a second computer system and a second storage device connected to said second computer system, wherein at least said first storage device and said second storage device are connected to each other, said data control method comprising the steps of:
    storing a log, in a disk device within said first storage device, that is used to generate an update of data, said data being produced as a result of processing performed by said first computer system and being stored in said first storage device;
    copying said log stored in said disk drive within said first storage device to a disk drive within said second storage device, said disk device within said second storage device being set to duplicate said log;
    updating said data stored in said first storage device, said data being produced as a result of said processing performed by said first computer system;
    detecting a change in data stored in said disk drive within said second storage device, said change being made as a result of performing said copying step by said second computer system;
    reading, by second computer system, said change in said data stored in said disk device within said second storage device; and
    reading, by said second computer system, said log copied to said disk drive within said second storage device and updating a duplicate of said data, stored in said first storage device, based on said log copied to said disk drive within said second storage device, said duplicate being stored in said second storage device,
    wherein a log unit of storing said log stored in said disk device within said first storage device is specified by said first computer system, and
    wherein a log unit of reading said log stored in said disk device within said first storage device is specified by said second computer system.

2. A data control method according to claim 1, wherein said log unit of storing said log stored in said disk device within said first storage device and said log unit of reading said log are specified regardless of transaction commitment.

3. A data control method according to claim 1, wherein said detecting step detects said change in said data stored in said disk drive within said second storage device at regular time intervals.

4. A data control method according to claim 1, wherein said detecting step detects said change in said data stored in said disk drive within said second storage device, adjusting time interval.

5. A data control method according to claim 1, wherein said detecting step detects said change in said data stored in said disk drive within said second storage device by controlling said second storage device through an interface for controlling said second storage device from said first storage device.

6. A data control method according to claim 1, wherein said detecting step detects said change in said data stored in said disk drive within said second storage device by controlling said second storage device through an interface for controlling said second storage device from said second computer system.

7. A first storage device, which is managed by an external device, and coupled to a second storage device comprising:
    a plurality of disk drives for storing data; and
    a first disk controller which is connected to said second storage device via a data transfer path, and controls said disk drives;
    wherein said first disk controller receives a log, which has been stored in said second storage device and is used to generate an update of data in said second storage device, via said data transfer path,
    wherein said first disk controller copies said log in a specific one of said disk drives,
    wherein said first disk controller notifies, said external management device of a change, which has been made as a result of the copying of said log, in data stored in a specific one of said disk drives, and
    wherein said first disk controller applies said log to the data which is duplicate of said data in said second storage device and is stored in a specific one of said disk drives, when said first disk controller receives a data update request which said external management device sends based on said notification of said change.

8. A storage device according to claim 7, further comprising:
an interface for selecting said specific one of said disk drives by said external device.

9. A storage device according to claim 8, wherein said selected specific disk drive is specified with a name of a specific component in a file system, in which said data is stored.

10. A storage device according to claim 7, wherein said data transfer path is accessed only by a plurality of disk controllers including both said first and second disk controllers.

11. A storage device according to claim 7, wherein said first disk controller notifies said external device of said change in data, by reading said change at regular time intervals and comparing a previous result of said reading step with a new reading result.

12. A storage device according to claim 11, further comprising:
an interface for selecting said regular time interval by said external device.

13. A first storage device, which is managed by an external device, and coupled to a second storage device comprising:
a plurality of disk drives for storing data; and
a first disk controller which is connected to said second storage device, via a data transfer path, and controls said disk drives,
wherein said first disk controller receives a log, which has been stored in said second storage device and is used to generate an update of data in said second storage device, via said data transfer path,
wherein said first disk controller copies said log in a specific one of said disk drives,
wherein said first disk controller changes a specific state in said second storage device,
wherein said state indicates whether data stored in a specific one of said disk drives is changed or not by said first disk controller according to an instruction, based on a change in operational state of a disk drive of said second storage device, sent from said second disk controller to said external device, and
wherein said first disk controller applies said log to the data which is duplicate of said data in said second storage device and is stored in a specific one of said disk drives, when said first disk controller receives a data update request which said external management device sends based on said instruction.

14. A storage device according to claim 13, wherein said first disk controller changes a specific state at regular time intervals.

15. A storage device according to claim 14, further comprising:
an interface for selecting said regular time interval by an external device.

16. A storage device according to claim 13, wherein said first disk controller notifies an external device of change in said state.

17. A storage device according to claim 16, wherein said first disk controller notifies in response to a periodical request from said external device.

* * * * *